(12) United States Patent
Nakamura

(10) Patent No.: US 9,756,207 B2
(45) Date of Patent: Sep. 5, 2017

(54) IMAGE SENSOR MODULE

(71) Applicant: ROHM CO., LTD., Kyoto-shi, Kyoto (JP)

(72) Inventor: Kuniaki Nakamura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/152,298

(22) Filed: May 11, 2016

(65) Prior Publication Data

US 2016/0337546 A1 Nov. 17, 2016

(30) Foreign Application Priority Data

May 14, 2015 (JP) ................................ 2015-099207

(51) Int. Cl.
*H04N 1/04* (2006.01)
*H04N 1/028* (2006.01)
*H04N 1/03* (2006.01)

(52) U.S. Cl.
CPC ..... *H04N 1/02885* (2013.01); *H04N 1/02855* (2013.01); *H04N 1/02865* (2013.01); *H04N 1/0306* (2013.01)

(58) Field of Classification Search
CPC ... B29C 33/52; B29D 11/00375; G01C 25/00; G01C 3/10; G01C 3/085; G02B 6/0021; G02B 6/0091; G02F 1/13338; G06F 2203/04109; G06F 3/0425; H04N 1/02855; H04N 1/02865; H04N 1/02885; H04N 1/0306
USPC ........ 345/175, 156, 157, 173, 176; 359/811, 359/455, 619; 178/18.01, 18.09; 250/201.6, 559.38; 264/2.5; 356/3, 3.01, 356/3.03, 3.05; 396/111
See application file for complete search history.

(56) References Cited

U.S. PATENT DOCUMENTS

| | | | | |
|---|---|---|---|---|
| 4,730,881 | A * | 3/1988 | Taguchi | G03H 1/00 340/438 |
| 2003/0184725 | A1* | 10/2003 | Takaoka | G01C 25/00 356/3 |
| 2004/0001193 | A1* | 1/2004 | Takaoka | G01C 3/085 356/3.03 |
| 2009/0127569 | A1* | 5/2009 | Sawada | G02B 6/0073 257/82 |
| 2012/0032926 | A1* | 2/2012 | Douxchamps | G02F 1/13338 345/175 |

(Continued)

FOREIGN PATENT DOCUMENTS

JP 2007-300536 11/2007

*Primary Examiner* — Negussie Worku
(74) *Attorney, Agent, or Firm* — Hamre, Schumann, Mueller & Larson, P.C.

(57) ABSTRACT

An image sensor module includes an elongated light emitting unit, a photodetector, a lens unit, a substrate with the photodetector mounted on. The substrate is spaced apart from the lens unit in a thickness direction of the substrate. The image sensor module further includes a resin case provided with a light emitting unit chamber, a lens unit chamber and a substrate chamber. The lens unit chamber has a first bottom face extending in the first direction, and the substrate chamber has a second bottom face extending in the first direction and facing opposite to the first bottom face in the thickness direction of the substrate. The first or second bottom face is formed with at least one protrusion extending in the thickness direction of the substrate.

20 Claims, 10 Drawing Sheets

(56) References Cited

U.S. PATENT DOCUMENTS

| | | | |
|---|---|---|---|
| 2012/0081801 A1* | 4/2012 | Duparre | B29C 33/52 359/811 |
| 2012/0194878 A1* | 8/2012 | Nakamura | H04N 1/0318 358/471 |
| 2013/0163021 A1* | 6/2013 | Kinoshita | H04N 1/02815 358/1.13 |
| 2013/0181311 A1* | 7/2013 | Sugiyama | H04N 1/193 257/432 |
| 2014/0293372 A1* | 10/2014 | Okamoto | H04N 1/0285 358/475 |
| 2014/0376065 A1* | 12/2014 | Okamoto | H04N 1/00989 358/475 |
| 2016/0147442 A1* | 5/2016 | Baderdinni | G06F 3/061 711/105 |
| 2016/0216634 A1* | 7/2016 | Shiraishi | G03G 15/0409 |
| 2016/0216635 A1* | 7/2016 | Shiraishi | G03G 15/0409 |

* cited by examiner

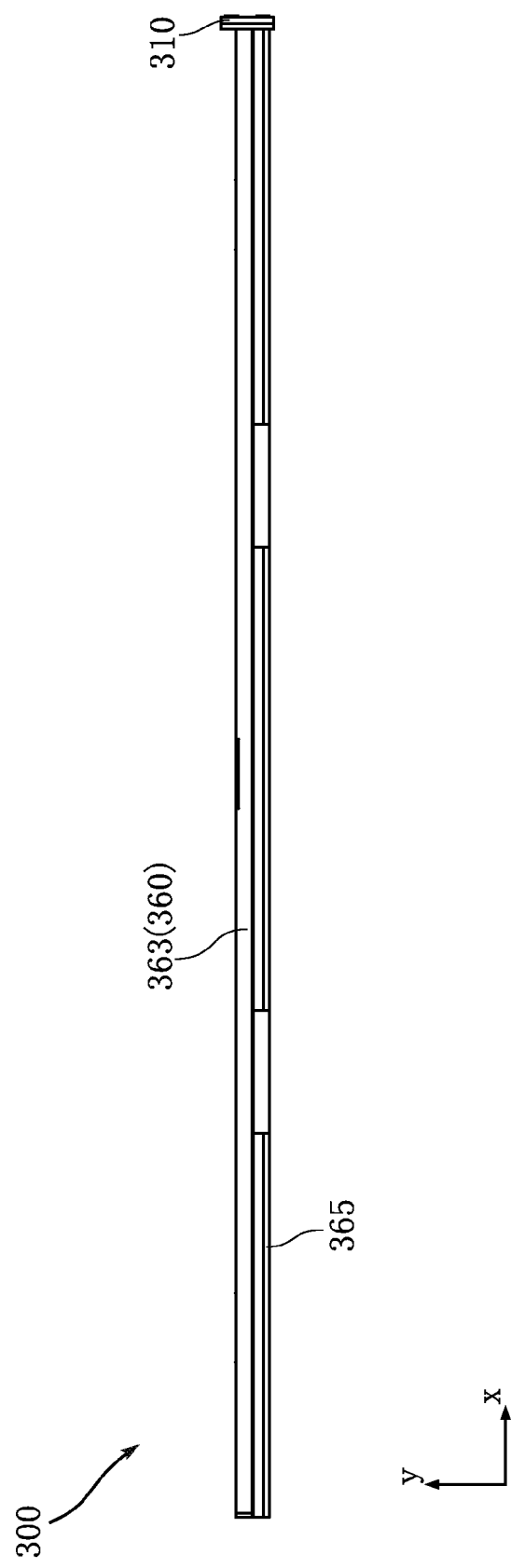

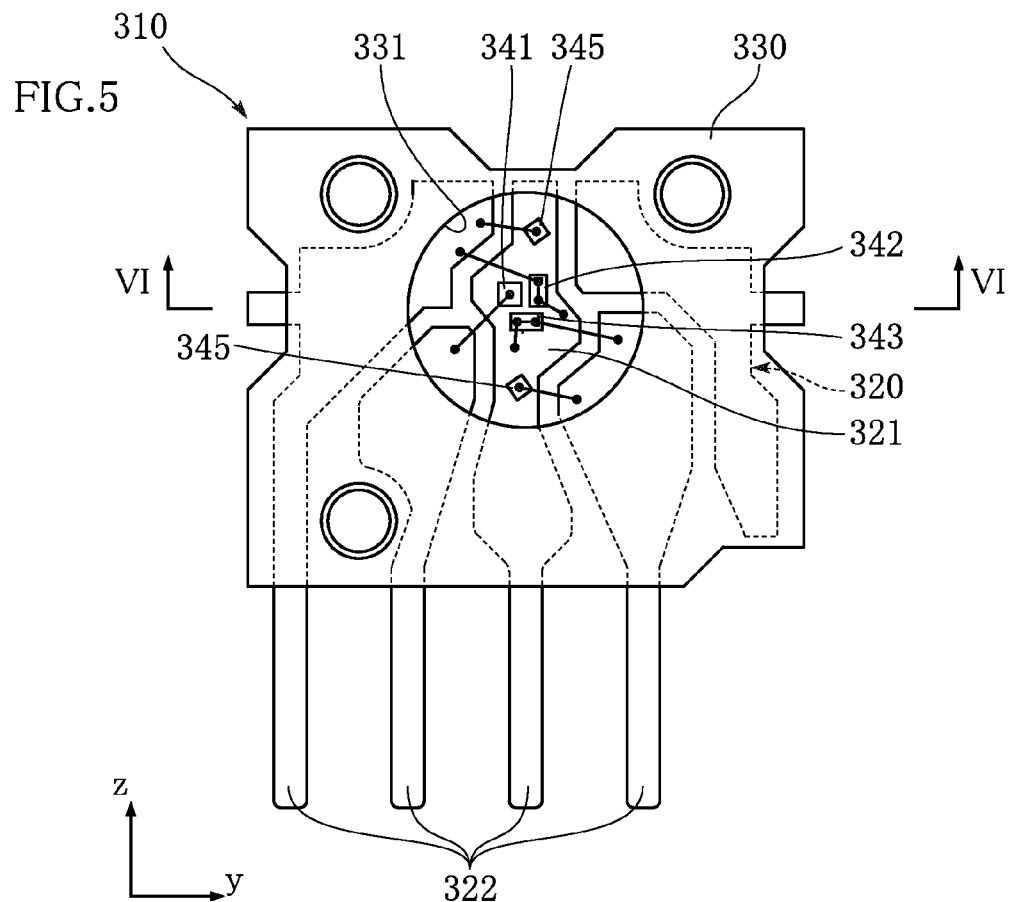
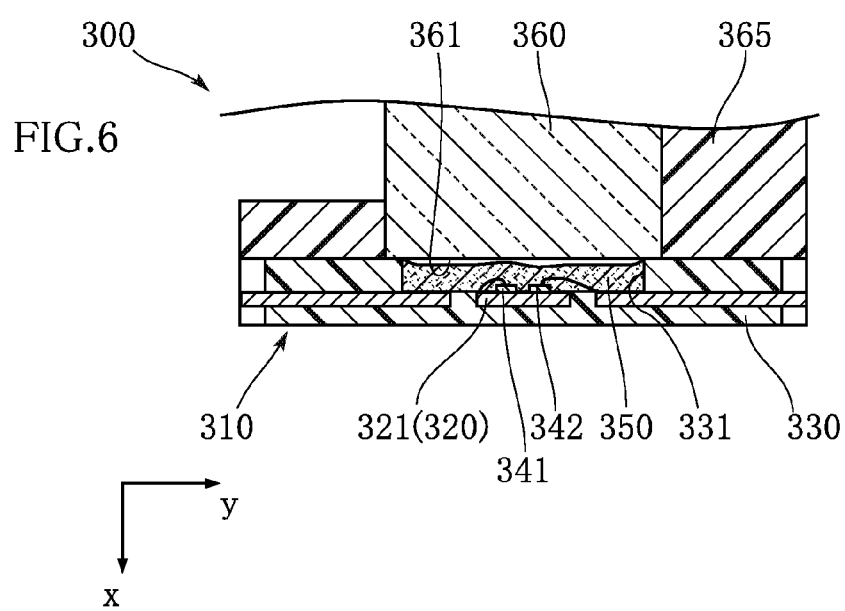

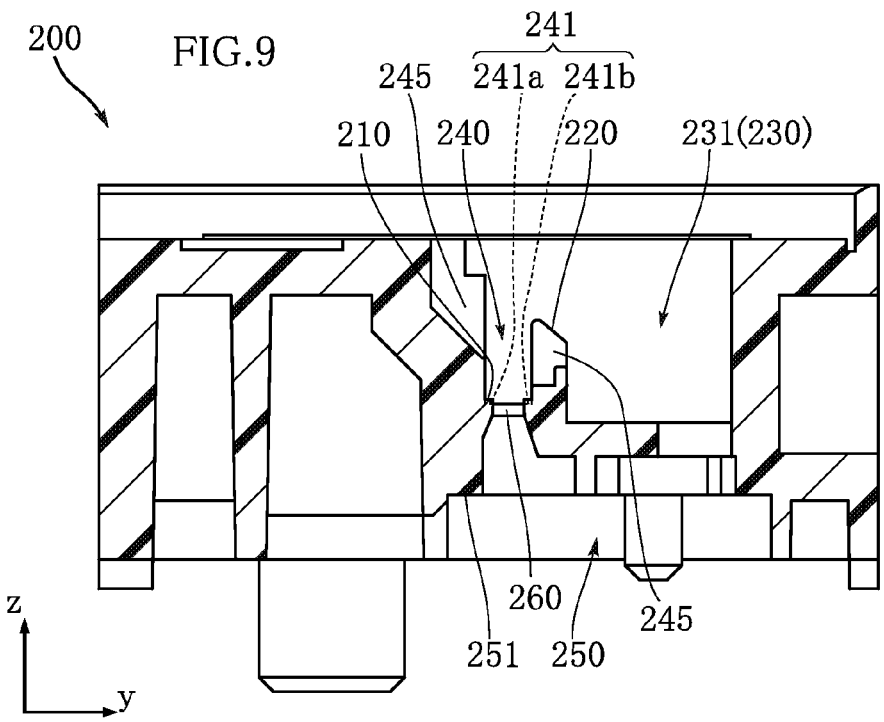
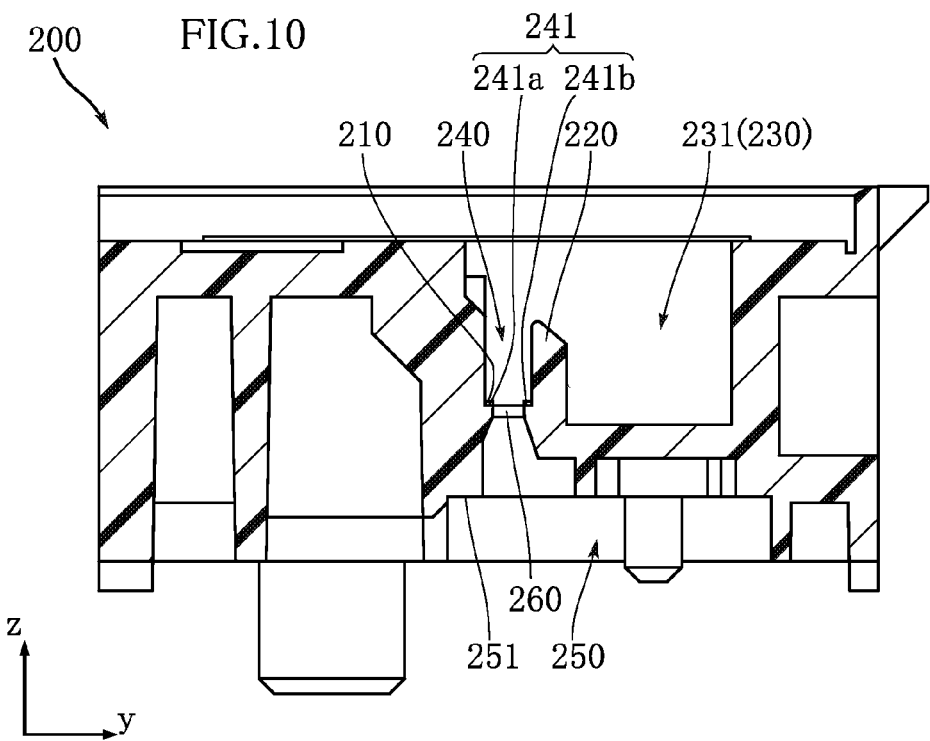

IMAGE SENSOR MODULE

BACKGROUND OF THE INVENTION

1. Field of the Invention

The present invention relates to an image sensor module.

2. Description of the Related Art

Image sensor modules are widely used to read the content in an object to be read, in the form of image data. The image sensor module is, for example, incorporated in a document scanner, to read the content of an object to be read relatively moving in a sub scanning direction, as image data. For example, JP-A-2007-300536 discloses an image sensor module configured to emit linear light extending in a main scanning direction to an object to be read, and to receive the reflected light with a sensor IC.

The image sensor according to JP-A-2007-300536 includes a light emitting unit, a photodetector, a lens unit, a substrate, and a case. The light emitting unit, which emits linear light, has an elongate shape in the main scanning direction. The photodetector extends in the main scanning direction and is mounted on the substrate. The lens unit also extends in the main scanning direction, and serves to converge the linear light reflected by the object to be read on the photodetector. The case accommodates therein the light emitting unit, the lens unit, the photodetector, and the substrate, and has a block shape extending in the main scanning direction. The case is formed of, for example, a resin material. Since the case is elongate in the main scanning direction, an error in size (distortion) from the design may be incurred at a position in the main scanning direction. When the case includes a distorted portion, the positional relationship between the lens unit and the photodetector enclosed in the case deviates from the designed value, which may lead to deviation of the focal point of the lens unit.

SUMMARY OF THE INVENTION

The present invention has been proposed in view of the foregoing situation and provides an image sensor module configured so as to eliminate or suppress the drawbacks resulting from the distortion of the case.

According to an aspect of the present invention, there is provided an image sensor module including: a light emitting unit that emits linear light to an object to be read, where the emitted linear light extends in a first direction; a photodetector extending in the first direction; a lens unit that converges light from the object on the photodetector; a substrate on which the photodetector is mounted, where the substrate is spaced apart from the lens unit in a second direction orthogonal to the first direction; and a case formed of a resin material and including a light emitting unit chamber in which the light emitting unit is accommodated, a lens unit chamber in which the lens unit is accommodated, and a substrate chamber in which the substrate is accommodated. The lens unit chamber includes a lens unit chamber bottom face extending in the first direction. The substrate chamber includes a substrate chamber bottom face extending in the first direction and facing opposite to the lens unit chamber bottom face in the second direction. At least one of the lens unit chamber bottom face and the substrate chamber bottom face is formed with at least one protrusion that protrudes in the second direction.

In an embodiment, the at least one protrusion includes a plurality of the protrusions spaced apart from each other in the first direction.

In an embodiment, the plurality of protrusions are different in height from each other.

In an embodiment, the case is formed as a single piece made of the resin material.

In an embodiment, the plurality of protrusions are made of the resin material and formed integral with the case.

In an embodiment, the case has a first end portion and a second end portion that are spaced apart from each other in the first direction.

In an embodiment, the plurality of protrusions are gradually greater in height with increasing distance from one of the first end portion and the second end portion toward the other one of the first end portion and the second end portion.

In an embodiment, the plurality of protrusions are gradually smaller in height with increasing distance from one of the first end portion and the second end portion toward a center of the case in the first direction.

In an embodiment, the resin material contains glass fibers.

In an embodiment, the at least one protrusion includes a plurality of protrusions provided on the lens unit chamber bottom face.

In an embodiment, the case is formed with a communication hole communicating with both the substrate chamber and the lens unit chamber.

In an embodiment, the lens unit chamber bottom face includes first and second partial bottom faces that are spaced apart from each other with the communication hole disposed inbetween in a third direction orthogonal to both the first direction and the second direction.

In an embodiment, the at least one protrusion includes a plurality of protrusions provided on each of the first partial bottom face and the second partial bottom face.

In an embodiment, the lens unit includes a plurality of lenses aligned in the first direction and a lens holder for retaining the plurality of lenses.

In an embodiment, the lens holder is made of a resin.

In an embodiment, the light emitting unit is provided with: an LED module including at least one LED chip; a light guide extending in the first direction; and a light guide case for retaining the light guide.

In an embodiment, the LED module is attached to an end portion of the light guide case that faces in the first direction.

In an embodiment, the light emitting unit chamber includes a light guide case chamber in which the light guide case is accommodated and an LED module chamber in which the LED module is accommodated, and the LED module chamber communicates with an end portion of the light guide case chamber that faces in the first direction.

In an embodiment, the light guide case chamber is arranged side-by-side with the lens unit chamber in a third direction orthogonal to both the first direction and the second direction, and the case includes a partitioning wall disposed between the lens unit chamber and the light guide case chamber.

In an embodiment, the light guide includes: an incident surface on which light from the LED module is incident; a reflecting surface extending in the first direction to reflect the light; and an emitting surface extending in the first direction and via which the light from the reflecting surface is emitted as linear light extending in the first direction, where the emitting surface is disposed closer to the lens unit than is the reflecting surface as viewed in the second direction.

Other features and advantages of the present invention will become more apparent through the detailed description given hereunder with reference to the drawings.

BRIEF DESCRIPTION OF DRAWINGS

FIG. 4 is a plan view showing a light emitting unit employed in the image sensor module shown in FIG. 1;

FIG. 5 is a front view showing an essential part of an LED module employed in the light emitting unit shown in FIG. 4;

FIG. 6 is a partial cross-sectional view of the light emitting unit shown in FIG. 4, taken along a line VI-VI in FIG. 5;

FIG. 9 is an enlarged cross-sectional view taken along a line IX-IX in FIG. 8A;

FIG. 10 is an enlarged cross-sectional view taken along a line X-X in FIG. 8A;

DETAILED DESCRIPTION OF PREFERRED EMBODIMENTS

Preferred embodiments of the present invention will be described below in detail with reference to the drawings.

Figure 1:
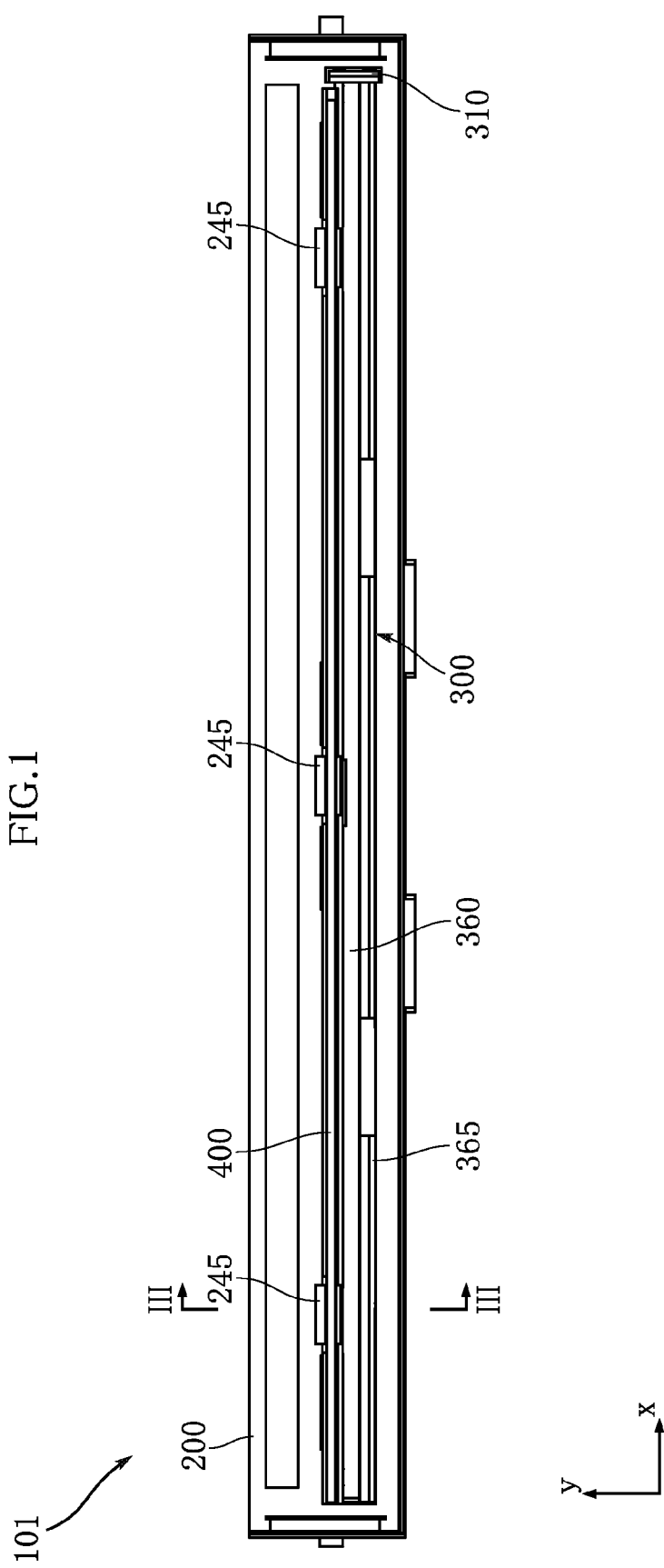
FIG. 1 is a plan view showing an image sensor module according to an embodiment of the present invention.
Figure 2:
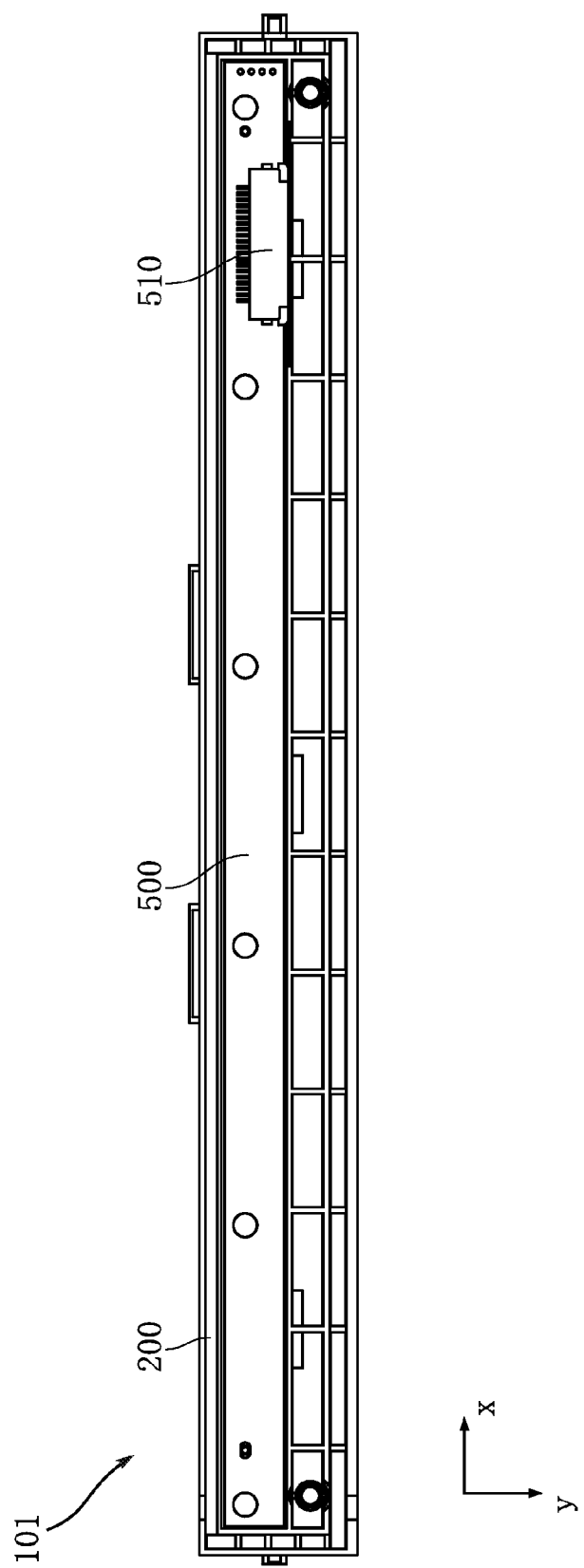
FIG. 2 is a bottom view of the image sensor module shown in FIG. 1.
Figure 3:
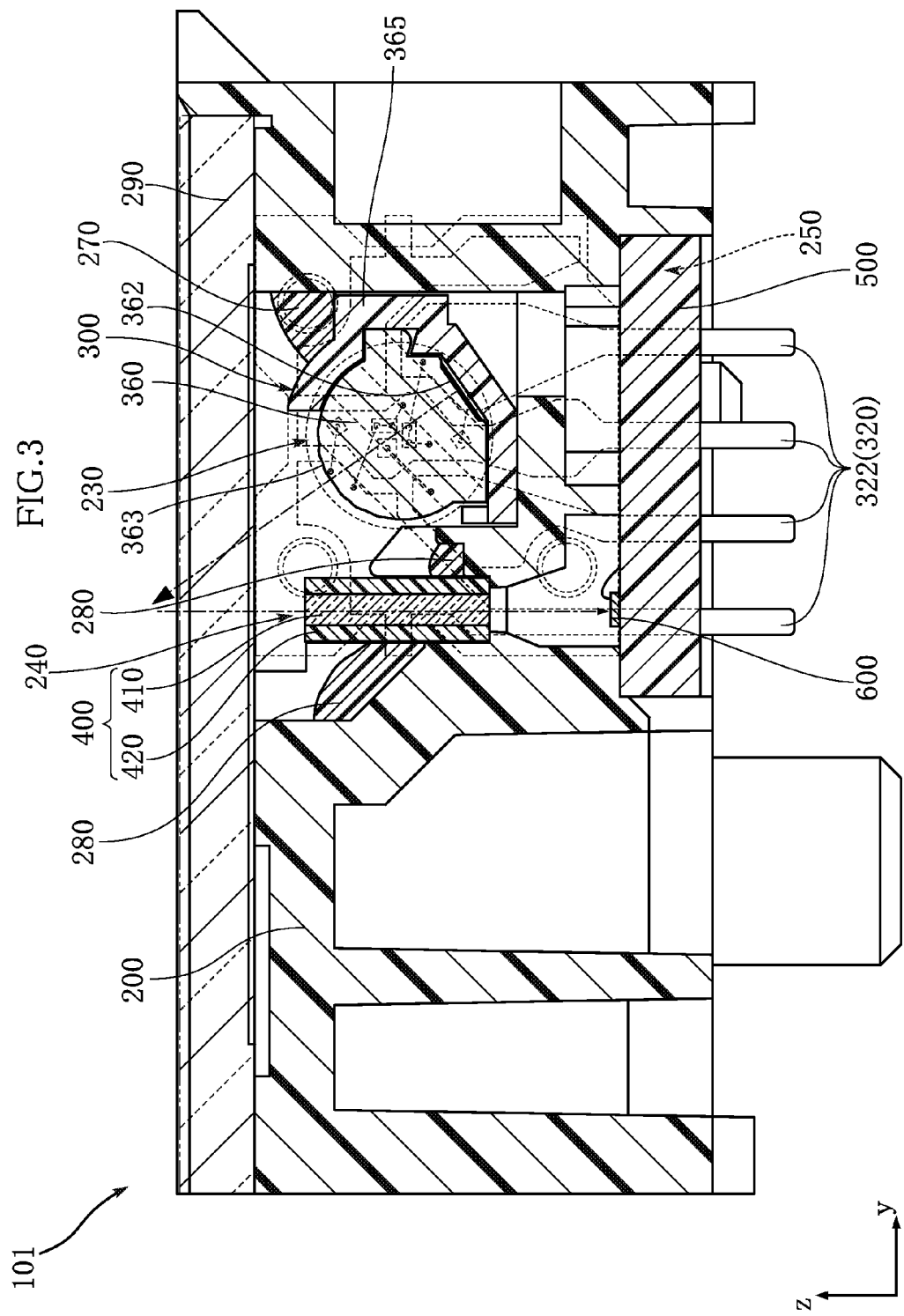
FIG. 3 is an enlarged cross-sectional view taken along a line III-III in FIG. 1.
Figure 7:
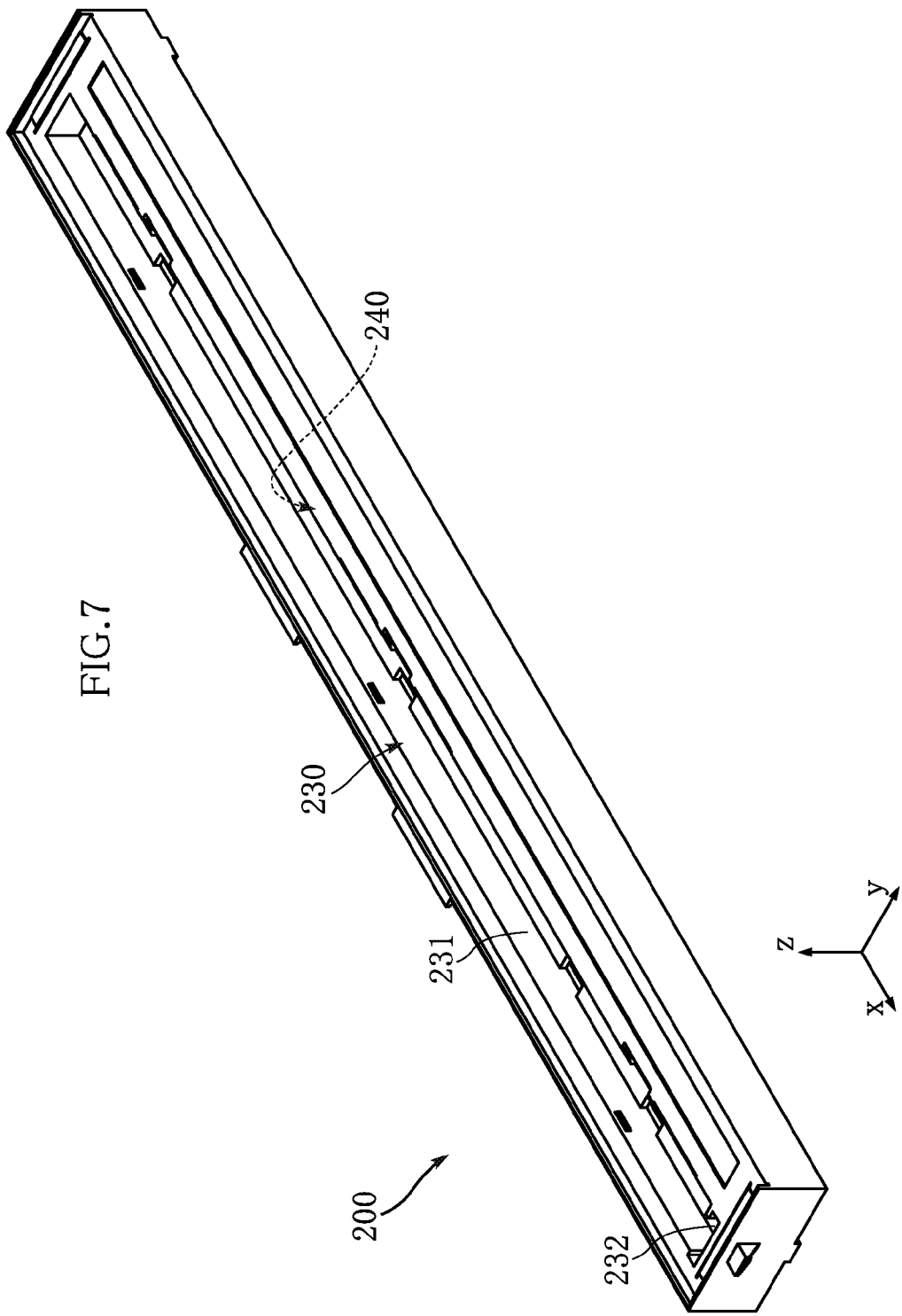
FIG. 7 is a perspective view showing a case employed in the image sensor module shown in FIG. 1.

FIGS. 1 to 3 illustrate an image sensor module according to an embodiment of the present invention. The illustrated image sensor module 101 includes a case 200, a light emitting unit 300, a lens unit 400, a substrate 500, and a photodetector 600. The image sensor module 101 may be incorporated for example in a scanner, to read an image on an object to be read as image data.

The case 200 constitutes the outer shell of the image sensor module 101, and accommodates therein the other components. The case 200 is elongate in a main scanning direction x (first direction), and the cross-section of the case 200 defined along a sub scanning direction y (third direction) and a thickness direction z (orthogonal to both the main scanning direction x and the sub scanning direction y) is formed in a generally rectangular shape. The dimensions of the case 200 may be, for example, approximately 230 to 280 mm in the main scanning direction x, approximately 20 to 30 mm in the sub scanning direction, and approximately 12 to 20 mm in the thickness direction z. Further details of the case 200 will be subsequently described.

The light emitting unit 300 includes, as shown in FIG. 4 and FIG. 6, an LED module 310, a light guide 360, and a light guide case 365. In the illustrated example, the light emitting unit 300 is configured to emit white linear light.

The light guide 360 has an elongate bar shape extending in the main scanning direction x, and is formed of, for example, a transparent acrylic resin such as polymethyl methacrylate (PMMA) resin. As shown in FIG. 3 and FIG. 6, the light guide 360 includes an incident surface 361, a reflecting surface 362, and an emitting surface 361. The incident surface 361 corresponds to an end face of the light guide 360 in the main scanning direction x, and is opposed to LED chips 341, 342, and 343 of the LED module 310. In this embodiment, a gap is formed between the incident surface 361 and a resin 350 that permits the passage of light emitted from the LED chips. In the illustrated example, the resin 350 is translucent, though the present invention is not limited to this. The reflecting surface 362 is elongate in the main scanning direction x, and configured to reflect the light proceeding through the light guide 360 after entering through the incident surface 361, in an obliquely upward direction to the left in FIG. 3. The reflecting surface 362 includes, for example, a plurality of grooves densely aligned in the main scanning direction x. The emitting surface 363 is elongate in the main scanning direction x, and located closer to the lens unit 400 than the reflecting surface 362 is, in a view in the thickness direction z. The emitting surface 363 permits the passage of the light reflected by the reflecting surface 362, allowing the emitted light to travel as linear light extending in the main scanning direction x.

The light guide case 365 serves to retain the light guide 360 and to prevent improper leakage of light from the light guide 360. The light guide case 365 is for example formed of a white resin, in a shape that surrounds the side of the light guide 360 on which the reflecting surface 362 is formed, substantially over the entire length, as shown in FIG. 3. As shown in FIG. 4, the LED module 310 is attached to an end portion of the light guide case 365 in the main scanning direction x. The portion of the light guide case 365 where the LED module 310 is attached is formed in a generally rectangular plate shape.

The LED module 310 includes, as shown in FIG. 5 and FIG. 6, a lead 320, an LED case 330, three LED chips 341, 342, and 343, two Zener diodes 345 and the translucent resin 350. Here, the translucent resin 350 is omitted from FIG. 5 for clarity.

The lead 320 supports the LED chips 341, 342, and 343 and the Zener diodes 345, and supplies a current to these chips and diodes, and is formed of a metal, for example a Cu alloy. The lead 320 includes a die bonding region 321 and a plurality of terminal portions 322. The die bonding region 321 is located in a generally central region of the lead 320, where the LED chips 341, 342, and 343 and the Zener diodes 345 are die-bonded. The terminal portions 322 each extend downward in the thickness direction z from the LED case 330, and are used to attach the LED module 310 (light emitting unit 300) to the substrate 500. The LED case 330 is for example formed of a white resin, in a generally rectangular shape. The LED case 330 partially covers the lead 320. The LED case 330 includes a recess 331. The recess 331 is formed in a circular shape so as to expose the die bonding region 321.

The three LED chips 341, 342, and 343 are die-bonded to the die bonding region 321. The LED chips 341, 342, and 343 are each connected to the lead 320 via a wire. The LED chips 341, 342, and 343 emit, for example, red light, green light and blue light, respectively. The LED chip 341 is die-bonded with Ag paste, for example. The LED chips 342 and 343 have an elongate rectangular shape and are 2-wire chips. The LED chips 342 and 343 are die-bonded with insulating resin paste, for example. The LED chips 341, 342, and 343 are located in a generally central region of the recess 331.

The Zener diodes 345 prevent electrostatic breakdown of the LED chips 341, 342, and 343, and are die-bonded to the die bonding region 321, for example with Ag paste. The Zener diodes 345 are each connected via a wire to a position on the lead 320 except for the die bonding region 321.

As shown in FIG. 6, the translucent resin 350 is formed to cover the LED chips 341, 342, and 343, the Zener diodes 345, and the plurality of wires connected to the chips and diodes, in the recess 331 of the LED case 330. In this embodiment, the surface of the translucent resin 350 is slightly concave from the surface of the LED case 330. As shown in FIG. 3, the light emitting unit 300 is fixed to the case 200 via an adhesive 270.

The substrate 500 has an elongate rectangular shape with the longer sides extending in the main scanning direction x and the shorter sides (width direction) extending in the sub scanning direction y, and is formed of a glass epoxy resin or ceramic, for example. On the substrate 500 the photodetector 600 is mounted, and the light emitting unit 300 is connected to the substrate 500. In addition, a connector 510 for connecting the image sensor module 101 to the scanner is provided on the substrate 500. The substrate 500 is fixed on the case 200, for example by thermocompression bonding.

The lens unit 400 is an erecting equal-magnification lens system configured to converge the light traveling from the object to be read in the thickness direction z on the photodetector 600. The lens unit 400 includes a plurality of lenses 410 and a lens holder 420. The lenses 410 are aligned in the main scanning direction x, with the respective optical axes oriented along the thickness direction z. The lens holder 420 is formed of an opaque resin, for example a glass epoxy resin, and retains the lenses 410. The lenses 410 are formed of, for example, an acrylic-based resin. As shown in FIG. 3, the lens unit 400 is fixed to the case 200 by an adhesive 280.

The photodetector 600 is mounted on the substrate 500. The photodetector 600 includes a plurality of photo detecting elements. The photo detecting elements are aligned in the main scanning direction x. The photodetector 600 has a photoelectric conversion function to convert the light received by the photo detecting elements into electrical signals. On the plurality of photo detecting elements, the light proceeding from the object to be read through the lens unit 400 is formed into an image.

As shown in FIG. 7 to FIG. 10, the case 200 includes a light emitting unit chamber 230, a lens unit chamber 240, an adhesive application region 245, a substrate chamber 250, a plurality of protruding portions 210, and a partitioning wall 220.

In this embodiment, the case 200 is integrally formed of a resin material with a resin molding tooling. An end portion of the case 200 in the longitudinal direction (main scanning direction x), for example the left-hand end portion in FIG. 8A, corresponds to the gate side (injection side of the resin material) in the molding process, and the other end portion of the case 200 in the longitudinal direction (main scanning direction x), for example the right-hand end portion in FIG. 8A, corresponds to the terminal of the flow path of the resin material in the molding process. Though not illustrated, a trace (minute burrs, fine dimples or bumps) reflecting the shape of the gate of the resin molding tooling remains on an end face of the case 200 in the main scanning direction x.

Examples of the resin material suitable for forming the case 200 include a polycarbonate resin and a mixture of the polycarbonate resin and an ABS (Acrylonitrile-Butadiene-Styrene) resin. In this embodiment, the case 200 contains glass fibers. The mixture ratio (by weight) of the glass fibers is in a range of 20 to 40%, of the overall weight of the case 200.

The light emitting unit chamber 230 is a space for accommodating the light emitting unit 300 in the case 200, and open to one side in the thickness direction z (upward in FIG. 9, FIG. 10). The light emitting unit chamber 230 includes a light guide case chamber 231 and an LED module chamber 232. The light guide case chamber 231 is a space for accommodating the light guide case 365. The LED module chamber 232 is a space for accommodating the LED module 310, and communicates with the end portion of the light guide case chamber 231 in the main scanning direction x.

The lens unit, chamber 240 is a space for accommodating the lens unit 400 in the case 200, and open to one side in the thickness direction z (upward in FIG. 9, FIG. 10). The lens unit chamber 240 is arranged side-by-side with the light emitting unit chamber 230 in the sub scanning direction y, with the partitioning wall 220 disposed therebetween. The partitioning wall 220 divides the lens unit chamber 240 and the light emitting unit chamber 230 from each other.

The lens unit chamber 240 includes a lens unit chamber bottom face 241. The lens unit chamber bottom face 241 is oriented to one side in the thickness direction z, and extends in the main scanning direction x. The lens unit chamber bottom face 241 includes a first and a second partial bottom face 241a, 241b. As shown in FIG. 9 and FIG. 10, the case 200 includes a communication hole 260 communicating with both of the lens unit chamber 240 and the substrate chamber 250, and the partial bottom faces 241a, 241b are spaced from each other in the sub scanning direction y across the communication hole 260.

Figure 8A:
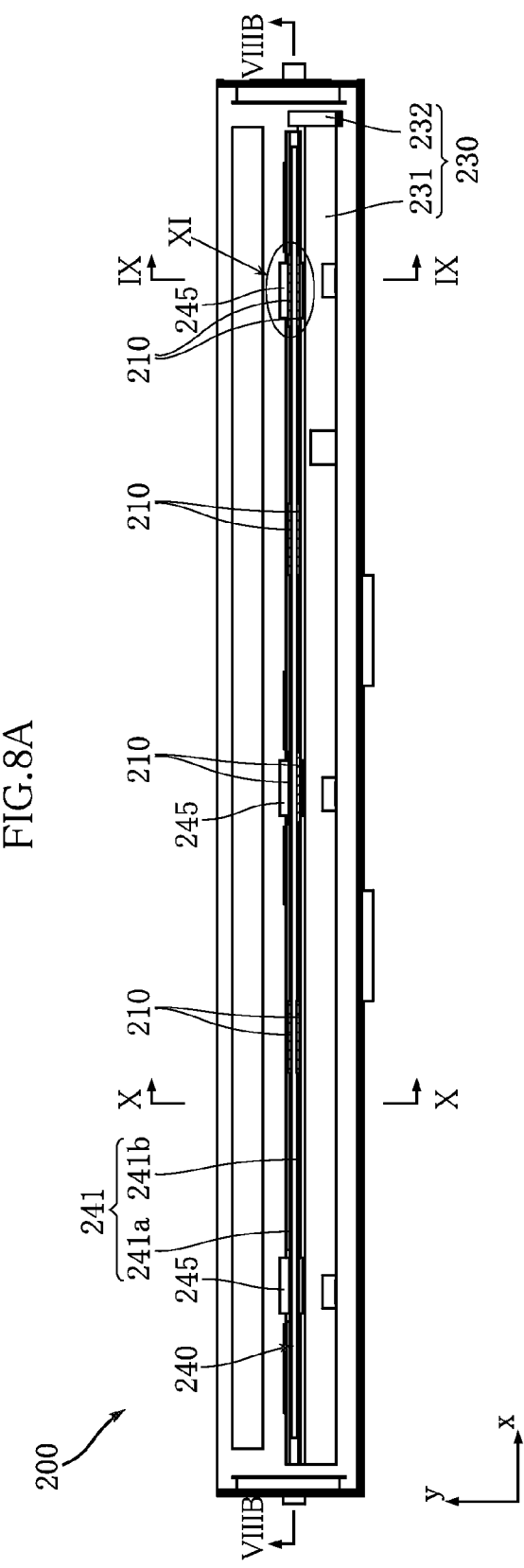
FIG. 8A is a plan view of the case shown in FIG. 7.

As shown in FIG. 8A to FIG. 13, the plurality of protruding portions 210 are formed on the lens unit chamber bottom face 241. In this embodiment, the protruding portions 210 are formed on each of the partial bottom faces 241a, 241b in a plurality of numbers. As shown in FIGS. 8A and 8B, the protruding portions 210 are spaced from each other in the main scanning direction x, on each of the partial bottom faces 241a, 241b. The protruding portions 210 are each formed so as to protrude in the thickness direction z. In FIGS. 8A, 8B and FIG. 11 to FIG. 13, the protruding portions 210 are hatched for clarity.

Figure 11:
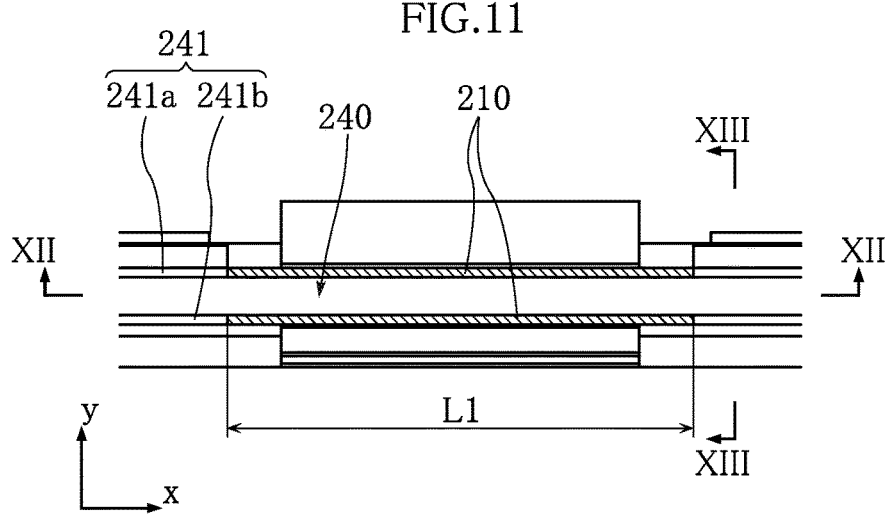
FIG. 11 is an enlarged plan view of a region indicated by XI in FIG. 8A, in the case shown therein.
Figure 12:
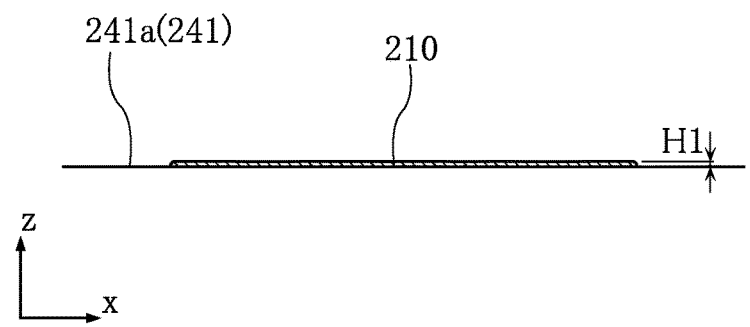
FIG. 12 is a side view of the region shown in FIG. 11, in a direction indicated by arrows XII-XII in FIG. 11.
Figure 13:
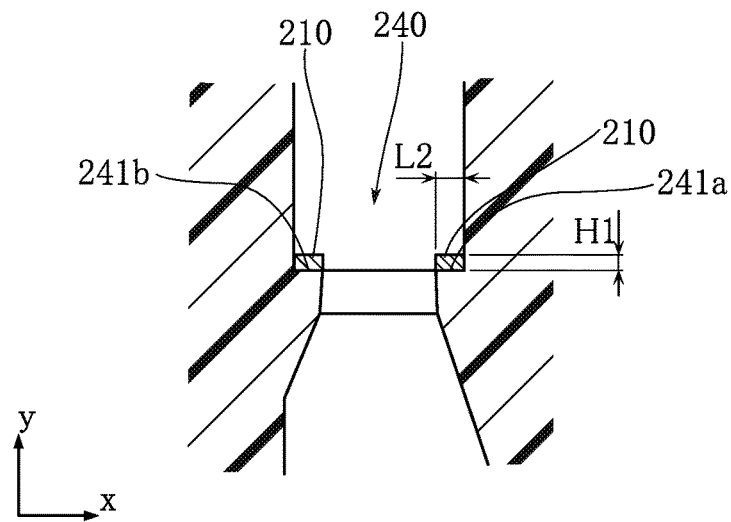
FIG. 13 is a partial cross-sectional view taken along a line XIII-XIII in FIG. 11.

FIG. 8A illustrates the locations of the protruding portions 210. In this embodiment, four protruding portions 210 are formed in the main scanning direction x, on each of the partial bottom faces 241a, 241b. Referring to FIG. 11 to FIG. 13, the size L1 of the protruding portions 210 in the main scanning direction x is, for example, approximately 10 to 15 mm, the size L2 in the sub scanning direction y is, for example, approximately 0.01 to 0.5 mm, and the size (height H1) in the thickness direction z is, for example, approximately 0.01 to 0.2 mm.

Figure 8B:
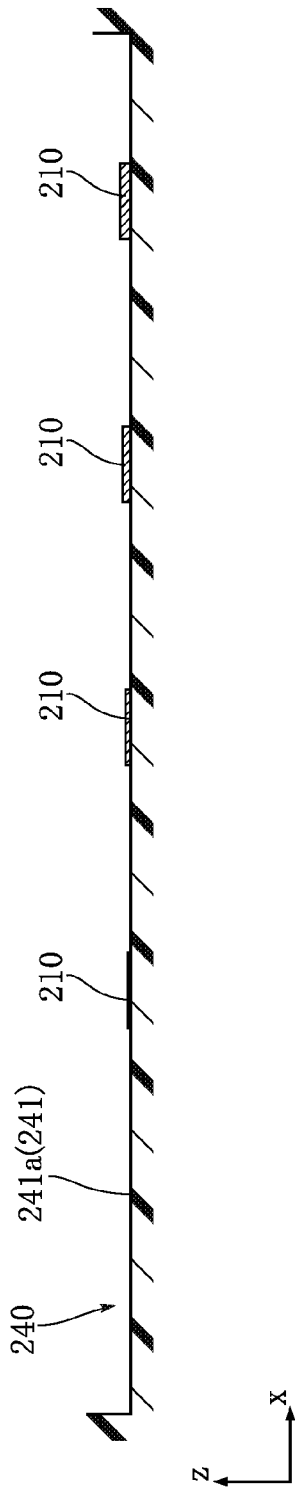
FIG. 8B is a partial cross-sectional view taken along a line VIIIB-VIIIB in FIG. 8A.

The plurality of protruding portions 210 may be different in height from each other, depending on the position in the main scanning direction x. In this embodiment, as shown, in FIG. 8B, the protruding portions 210 are each formed with an increased height, from the one on one end portion of the case 200 toward the one on the other end portion thereof, in the main scanning direction x. Specific examples of the respective heights of the protruding portions 210 are, approximately, 0.013 mm, 0.025 mm, 0.038 mm, and 0.05 mm from the left to the right in FIG. 8B. In FIG. 8B, the heights of the protruding portions 210 are exaggerated.

When the lens unit 400 is accommodated in the case 200 (lens unit chamber 240), the bottom face of the lens holder 420 contacts the lens unit chamber bottom face 241 or the protruding portions 210. Through the contacts between the lens holder 420 and the lens unit chamber bottom face 241 or the protruding portions 210, the position of the lens unit 400 with respect to the case 200 in the thickness direction z is defined at different positions of the lens unit 400 in the main scanning direction x.

The substrate chamber 350 is a space for accommodating the substrate 500 in the case 200, and open to the other side in the thickness direction (downward in FIG. 9, FIG. 10). The substrate chamber 250 includes a substrate chamber bottom face 251. When the substrate 500 is accommodated in the case 200 (substrate chamber 250), the bottom face of the substrate 500 contacts the substrate chamber bottom face 251. Through the contact between the substrate 500 and the substrate chamber bottom face 251, the position of the substrate 509 with respect to the case 200 in the thickness direction z is defined at different positions of the substrate 500 in the main scanning direction x.

The adhesive application region 245 is a recess for applying the adhesive 280 to fix the lens unit 400. In this embodiment, as shown in FIG. 8A, three adhesive application regions 245 are formed with a spacing from each other in the main scanning direction x. Each of the adhesive application regions 245 is a recess formed on a part of the wall face on both sides of the lens unit chamber 240 in the sub scanning direction y.

In this embodiment, a glass cover 290 is attached to the upper face of the case 200, so as to cover the upward opening of the case 200.

Advantages of the image sensor module 101 will be described below.

In this embodiment, the protruding portions 210 are formed on the lens unit chamber bottom face 241 of the case 200. When the lens unit 400 is accommodated in the lens unit chamber 240 (case 200), the position of the lens unit 400 with respect to the case 200 in the thickness direction z is defined at different positions of the lens unit 400 in the main scanning direction x, owing to the contact between the lens unit 400 (lens holder 420) and the lens unit chamber bottom face 241 or the protruding portions 210. The case 200 may be distorted since it is a molded resin product. According to the illustrated embodiment, protruding portions 210 are provided so as to compensate the distortion of the case 200, so that the positional relationship between the lens unit 400 and the photodetector 600 in the case 200 is to be maintained within a proper range. In this manner, drawbacks resulting from the distortion of the case 200 can be eliminated or suppressed.

Unlike the illustrated embodiment, the protruding portions 210 may be provided on the substrate chamber bottom face 251. When the protruding portions 210 are formed on the substrate chamber bottom face 251, the position of the photodetector 600 mounted on the substrate 500 with respect to the case 200 in the thickness direction z is defined, and therefore the positional relationship between the lens unit 400 and the photodetector 600 can be maintained in a proper range. The protruding portions 210 may be provided on either or both of the lens unit chamber bottom face 241 and the substrate chamber bottom face 251, depending on the need.

A plurality of protruding portions 210 are provided at predetermined intervals in the main scanning direction x, in which the case 200 is elongate. Thus, each of the protruding portions 210 can be configured to compensate, the local distortion of the case 200 which may occur at or around the particular position.

The plurality of protruding portions 210 may be different in height from each other, depending on the position in the main scanning direction x. In this embodiment, the protruding portions 210 are each formed with an increased height, from the one on one end portion of the case 200 toward the one on the other end portion thereof, in the main scanning direction x. The specific state of the distortion of the case 200 largely varies depending on the shape and material of the case 200. Factors that influence the state of distortion of the case 200 include, for example, the shape of a cross-section orthogonal to the main scanning direction x and balance in weight among different positions of the case 200. In addition, the distortion appears differently between a position closer to the gate and a position farther from the gate, through the resin molding process. However, when the shape and material of the case 200 and the specification of the resin molding tooling are determined, the same tendency can be observed in the distortion that appears after the resin molding process. Therefore, it is desirable to make the respective heights of the plurality of protruding portions 210 different from each other according to the extent of the distortion at the position where each of the protruding portions 210 is provided. In this embodiment, the protruding portions 210 are each formed with an increased height, from one end portion of the case 200 toward the other end portion thereof, in the main scanning direction x. Such a configuration allows the distortion to be effectively compensated when the deformation due to the distortion is larger at a position more distant from the gate.

Unlike the illustrated embodiment, the protruding portions 210 may each be formed with a reduced height, from one end portion of the case 200 (infection side of the resin material) toward the other end portion thereof (terminal of the flow path of the resin material), in the main scanning direction x. Thus, the respective heights of the plurality of protruding portions 210 may be made to gradually vary from one end portion of the case 200 toward the other end portion thereof in the main scanning direction x, depending on the distortion.

A plurality of protruding portions 210 are provided on each of the partial bottom faces 241a, 241b of the lens unit chamber bottom face 241. This configuration allows the position of the lens unit 400 with respect to the case 200 in the thickness direction to be more accurately defined.

The plurality of protruding portions 210 are formed of a resin material integrally with the case 200, as a part thereof. Accordingly, the protruding portions can be formed on the case 200 by forming recesses at predetermined positions of the resin molding tooling so as to correspond to the respective protruding portions 210. Thus, the drawbacks originating from the distortion of the case 200 can be easily minimized.

The lens unit 400 includes the plurality of lenses 410 aligned in the main scanning direction x and the lens holder 420 retaining the lenses 410. The lens holder 420 is formed of a resin. Accordingly, the lens holder 420 can be slightly deformed by making the protruding portions 210 abut against a predetermined position of the lens holder 420, to thereby micro-adjust the distance between the photodetector 600 and the lenses 410 retained by the lens holder 420. Such a configuration contributes to upgrading the picture quality of the image data read by the image sensor module 101.

Figure 14A:
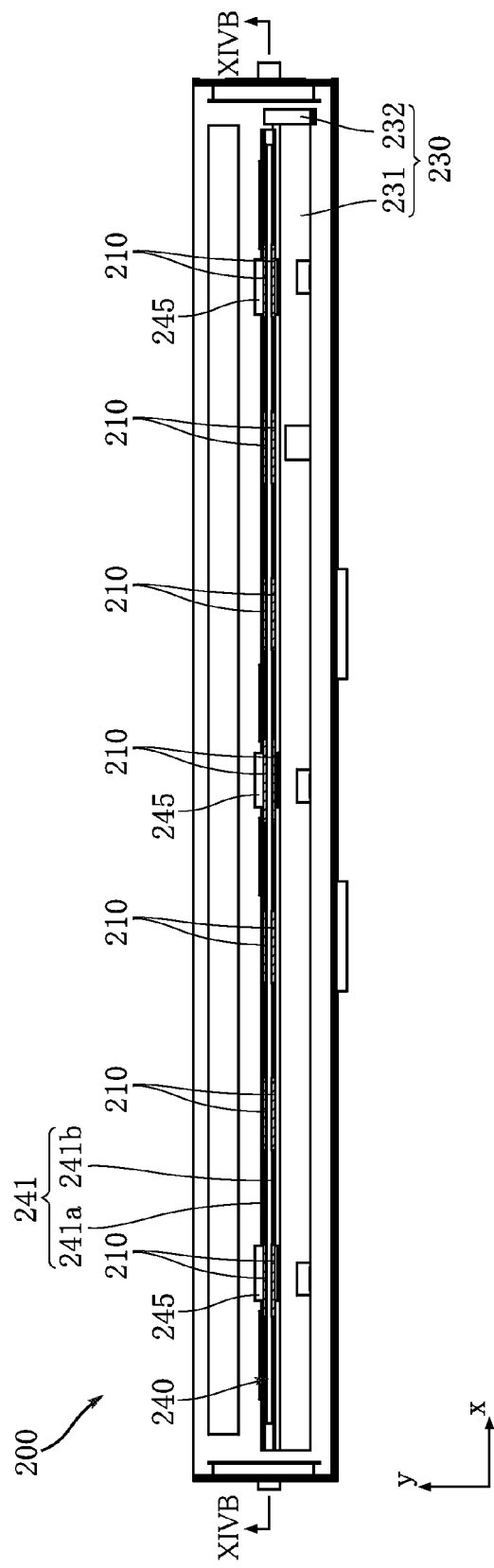
FIG. 14A is a plan view showing a variation of the case shown in FIG. 8.
Figure 14B:
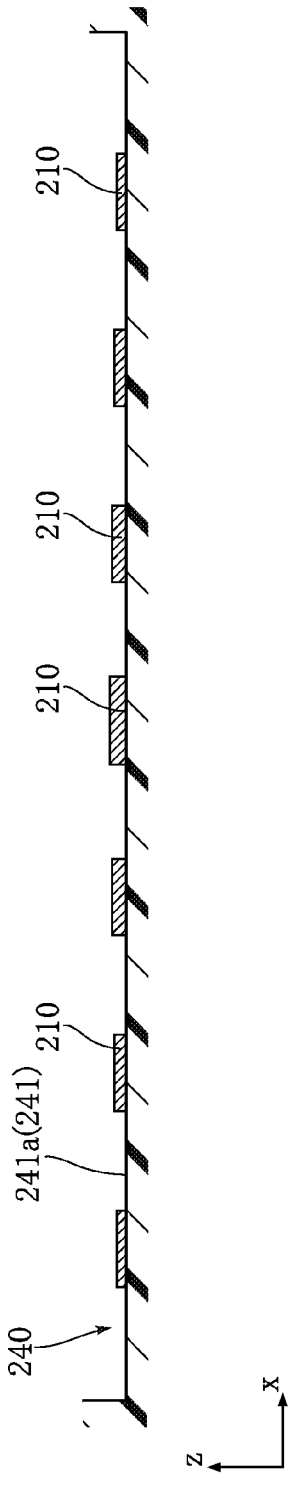
FIG. 14B is a partial cross-sectional view taken along a line XIVB-XIVB in FIG. 14A.

FIGS. 14A and 14B illustrate a variation of the image sensor module 101. In FIG. 14, the elements same as or similar to those of the foregoing embodiment are designated by the same numerals.

FIGS. 14A and 14B illustrate a variation of the case 200. The case 200 shown in FIGS. 14A and 14B is different from that of the embodiment in the configuration of the protruding portions 210. In this variation, the positions and the heights of the protruding portions 210 are different from those of the embodiment. For clarity, the protruding portions 210 are hatched in FIGS. 14A and 14B.

In this variation, seven protruding portions 210 are formed in the main scanning direction x, on each of the partial bottom faces 241a, 241b of the lens unit chamber bottom face 241. As shown in FIG. 14B, in this variation the protruding portions 210 are each formed with an increased height, from an end portion of the case 200 toward the central portion thereof, in the main scanning direction x. In FIG. 14B, the heights of the protruding portions 210 are exaggerated.

Such a configuration also allows the positional relationship between the lens unit 400 and the photodetector 600 accommodated in the case 200 to be maintained within a proper range. Alternatively, unlike the configuration shown in FIG. 14, the protruding portions 210 may each be formed with a reduced height, from the end portion of the case 200 toward the central portion thereof, in the main scanning direction x. Thus, the respective heights of the plurality of protruding portions 210 may be made to gradually vary from the end portion of the case 200 toward the central portion thereof in the main scanning direction x. This variation is appropriate when the extent of the distortion of the case 200 is different between the end portion and the central portion in main scanning direction x. Further, instead of the configuration shown in FIG. 14, a single protruding portion 210 may be provided in the central portion of the case 200 in the main scanning direction x.

The image sensor module according to the present invention is not limited to the foregoing embodiments. The specific configuration of each element of the image sensor module according to the present invention may be modified in various manners.

The invention claimed is:

1. An image sensor module comprising:
a light emitting unit that emits linear light to an object to be read, the linear light extending in a first direction;
a photodetector extending in the first direction;
a lens unit that converges light from the object on the photodetector;
a substrate on which the photodetector is mounted, the substrate being spaced apart from the lens unit in a second direction orthogonal to the first direction; and
a case formed of a resin material and defining a light emitting unit chamber in which the light emitting unit is accommodated, a lens unit chamber in which the lens unit is accommodated, and a substrate chamber in which the substrate is accommodated,
wherein the lens unit chamber includes a lens unit chamber bottom face extending in the first direction,
the substrate chamber includes a substrate chamber bottom face extending in the first direction and facing opposite to the lens unit chamber bottom face in the second direction, and
at least one of the lens unit chamber bottom face and the substrate chamber bottom face is formed with at least one protrusion protruding in the second direction.

2. The image sensor module according to claim 1, wherein a plurality of the at least one protrusion are present and are spaced apart from each other in the first direction.

3. The image sensor module according to claim 2, wherein the plurality of protrusions are different in height from each other.

4. The image sensor module according to claim 2, wherein the case is formed as a single piece made of the resin material.

5. The image sensor module according to claim 4, wherein the plurality of protrusions are made of the resin material and formed integral with the case.

6. The image sensor module according to claim 2, wherein the case has a first end portion and a second end portion that are spaced apart from each other in the first direction.

7. The image sensor module according to claim 6, wherein the plurality of protrusions are gradually greater in height with increasing distance from one of the first end portion and the second end portion toward the other one of the first end portion and the second end portion.

8. The image sensor module according to claim 6, wherein the plurality of protrusions are gradually smaller in height with increasing distance from one of the first end portion and the second end portion toward a center of the case in the first direction.

9. The image sensor module according to claim 1, wherein the resin material contains glass fibers.

10. The image sensor module according to claim 1, wherein the at least one protrusion includes a plurality of protrusions provided on the lens unit chamber bottom face.

11. The image sensor module according to claim 1, wherein the case is formed with a communication hole communicating with both the substrate chamber and the lens unit chamber.

12. The image sensor module according to claim 11, wherein the lens unit chamber bottom face includes a first partial bottom face and a second partial bottom face that are spaced apart from each other with the communication hole disposed inbetween in a third direction orthogonal to both the first direction and the second direction.

13. The image sensor module according to claim 12, wherein the at least one protrusion includes a plurality of protrusions provided on each of the first partial bottom face and the second partial bottom face.

14. The image sensor module according to claim 1, wherein the lens unit comprises a plurality of lenses aligned in the first direction and a lens holder for retaining the plurality of lenses.

15. The image sensor module according to claim 14, wherein the lens holder is made of a resin.

16. The image sensor module according to claim 1, wherein the light emitting unit comprises: an LED module including at least one LED chip; a light guide extending in the first direction; and a light guide case for retaining the light guide.

17. The image sensor module according to claim 16, wherein the LED module is attached to an end portion of the light guide case that faces in the first direction.

18. The image sensor module according to claim 17, wherein the light emitting unit chamber comprises a light guide case chamber in which the light guide case is accommodated and an LED module chamber in which the LED module is accommodated, and
the LED module chamber communicates with an end portion of the light guide case chamber that faces in the first direction.

19. The image sensor module according to claim 18, wherein the light guide case chamber is arranged side-by-side with the lens unit chamber in a third direction orthogonal to both the first direction and the second direction, and
the case comprises a partitioning wall disposed between the lens unit chamber and the light guide case chamber.

20. The image sensor module according to claim 16, wherein the light guide comprises: an incident surface on which light from the LED module is incident; a reflecting surface extending in the first direction to reflect the light; and an emitting surface extending in the first direction and via which the light from the reflecting surface is emitted as linear light extending in the first direction, and the emitting surface is disposed closer to the lens unit than is the reflecting surface as viewed in the second direction.

\* \* \* \* \*